(12) United States Patent
Miller et al.

(10) Patent No.: US 8,936,746 B2
(45) Date of Patent: Jan. 20, 2015

(54) BRACKET FOR A QUARTZ LAMP OF A BLOW MOLDING MACHINE

(75) Inventors: Donald Wayne Miller, Waterville, OH (US); Dennis Hahn, Whitehouse, OH (US)

(73) Assignee: Plastic Technologies, Inc., Holland, OH (US)

( * ) Notice: Subject to any disclaimer, the term of this patent is extended or adjusted under 35 U.S.C. 154(b) by 420 days.

(21) Appl. No.: 13/286,614

(22) Filed: Nov. 1, 2011

(65) Prior Publication Data

US 2012/0104662 A1 May 3, 2012

Related U.S. Application Data

(60) Provisional application No. 61/408,841, filed on Nov. 1, 2010.

(51) Int. Cl.
*B29C 49/68* (2006.01)
*B29C 49/64* (2006.01)
*B29C 49/06* (2006.01)

(52) U.S. Cl.
CPC ............... *B29C 49/64* (2013.01); *B29C 49/68* (2013.01); *B29C 49/06* (2013.01); *B29C 49/6418* (2013.01)
USPC ............ 264/535; 248/205.1; 362/217.14; 362/217.16; 362/217.17; 362/457; 313/49; 425/472; 425/526

(58) Field of Classification Search
CPC ........................................ B29C 49/68
USPC ........... 425/174.4, 526, 472; 313/49, 318.02; 362/388, 396, 430, 457, 217.14, 217, 362/6, 217.17, 217.16; 248/205.1, 213.3, 248/213.4, 232–234; 29/401.1
See application file for complete search history.

(56) References Cited

U.S. PATENT DOCUMENTS

| | | | |
|---|---|---|---|
| 3,833,326 A * | 9/1974 | Peterson et al. | 425/174.4 |
| 4,783,211 A * | 11/1988 | Fuchigami et al. | 65/162 |
| 5,549,468 A | 8/1996 | Mitchell et al. | |
| 5,688,466 A | 11/1997 | Mitchell et al. | |
| 5,920,677 A | 7/1999 | Emmer et al. | |
| 7,649,158 B2 | 1/2010 | Doudement | |
| 2002/0160069 A1* | 10/2002 | Chin | 425/143 |
| 2004/0113326 A1* | 6/2004 | Gernhuber et al. | 264/492 |

FOREIGN PATENT DOCUMENTS

GB 1433744 A * 4/1976

* cited by examiner

*Primary Examiner* — Robert B Davis
(74) *Attorney, Agent, or Firm* — Fraser Clemens Martin & Miller LLC; Michael E. Dockins

(57) ABSTRACT

An extension for a heating element includes a bracket for a quartz lamp within a furnace of a blow molding machine. The extension includes a base that is coupled to the furnace where the extension directs the heating element toward an end of a preform. The extension may include a parabolic lens to provide controlled and directed heating of the end of the preform to optimize material distribution upon blow molding.

28 Claims, 3 Drawing Sheets

BRACKET FOR A QUARTZ LAMP OF A BLOW MOLDING MACHINE

CROSS-REFERENCE TO RELATED APPLICATION

This application claims the benefit of priority of U.S. Provisional Patent Application Ser. No. 61/408,841 filed on Nov. 1, 2010 which is incorporated herein by reference in its entirety.

FIELD OF THE INVENTION

This section provides background information related to the present disclosure which is not necessarily prior art.

The manufacture of various containers, including bottles, made of a thermoplastic such as polyethylene terephthalate (PET) can be accomplished using a preform that can be shaped by blow molding to form the container body and bottom. A neck of the preform is generally not modified when converted into the blow molded container. In preparation for the blow molding operation, the preform can be heated in a furnace of a blow molding apparatus where the body and the bottom of the preform can be raised to a temperature greater than the glass transition temperature of the thermoplastic material. In this way, the thermoplastic material can be more easily deformed.

Heating can be affected by exposing the preform to a furnace comprising a longitudinal heating tunnel. The furnace can include one or more successive heating modules along the tunnel. Each module can include a superposition of heating elements (e.g., halogen lamps) placed along a wall of the heating tunnel, with the axis of the heating elements parallel to the longitudinal axis of the tunnel. The opposite wall of the tunnel can include one or more reflector elements. The heating elements themselves can also include various reflector elements, shades, and/or lenses to direct and focus the thermal energy. The preform can be moved through the heating tunnel between the heating elements and the reflector elements while being rotated to distribute thermal energy to various portions of the preform. However, distribution of thermal energy may not be even at all points of the preform. The heating profile can be predetermined and designed according to the shape of the preform and of the final container.

In order to obtain a predetermined heating profile, the thermal energy provided by the heating elements in each of the modules can be adjusted. Thermal energy transferred to portions of the preform can be controlled by changing the power of lamps in particular positions relative to the preform. For example, the various lamps in the same module may emit different amounts of thermal energy and various lamps of different modules may emit different amounts of power. Likewise, distances of the heating elements and/or the reflectors relative to the preform can be adjusted to provide a predetermined heating profile. Different heating profiles can therefore be designed for differently sized and shaped preforms and for forming containers of various sizes and shapes. Such adjustment capability makes it possible to adapt the configuration of the furnace to the profile of the preform to be used for production of particular containers. Ways to deliver thermal energy to a preform are described in U.S. Pat. No. 7,649,158 to Doudement, U.S. Pat. No. 5,920,677 to Emmer et al., U.S. Pat. No. 5,688,466 to Mitchell et al., and U.S. Pat. No. 5,549,468 to Mitchell et al., all of which are incorporated herein by reference in their entirety.

SUMMARY OF THE INVENTION

The present technology includes systems, processes, and articles of manufacture that relate to an extension for a heating element, such as quartz lamp, for a blow molding apparatus.

In some embodiments, a heating element extension is configured to hold a quartz lamp in a repeatable fixed location in a blow molding apparatus furnace to heat the radius of a preform end, controlling the material distribution in the final container. The apparatus allows the heating element to be held over the cap of the preform, where it can be positioned a specified angle. The extension also holds the base of the heating element, for example, by using a bracket to hold an end of a quartz lamp compared to clamping around the quartz tube itself. The front portion of the holder can hold a parabolic lens in front of the lamp to provide controlled heating in the end of the preform. This can lead to better bottle performance due to improved material distribution in the base of the bottle.

In some embodiments, a heating element extension for positioning a heating element in a furnace of a blow molding apparatus is provided. The extension comprises a base at one end of the extension, the base configured to couple the extension to the furnace. The extension also comprises a bracket at another end of the extension, the bracket configured to hold the heating element.

In some embodiments, a blow molding apparatus is provided. The apparatus includes a furnace comprising a heating element extension where the extension comprises a base at one end of the extension, the base configured to couple the extension to the furnace, and a bracket at another end of the extension, the bracket configured to hold the heating element.

In some embodiments, a method for heating an end of a preform is provided. The method includes providing a blow molding apparatus comprising a furnace, the furnace comprising a planar array of heating elements and a separate heating element held by a heating element extension. The extension comprises a base at one end of the extension coupling the extension to the furnace and a bracket at another end of the extension holding the separate heating element. The furnace further comprises a preform having an end, wherein the separate heating element held by the bracket of the extension is directed toward the end of the preform. The method includes heating the end of the preform using the separate heating element.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
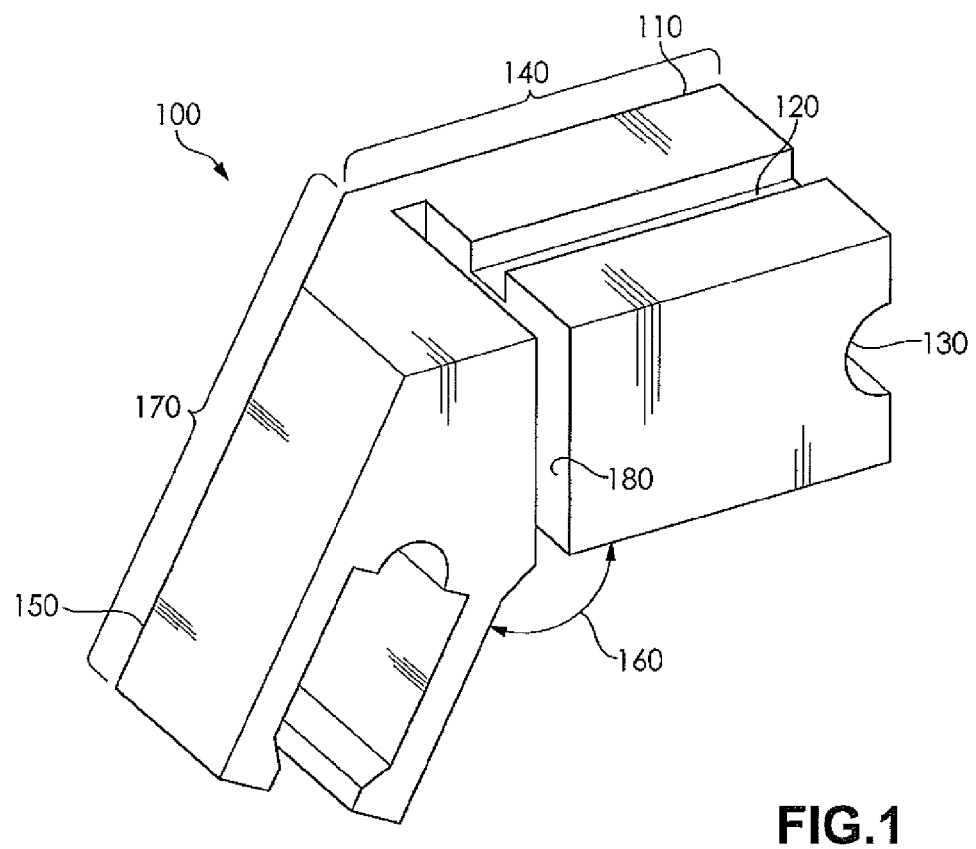
FIG. 1 is a perspective view of a heating element extension for holding a quartz lamp according to an embodiment of the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments.

In some blow molding processes, preforms having substantially the same dimensions made of substantially the same materials are used to form substantially the same type of containers. A particular arrangement of heating elements in a furnace of a blow molding apparatus can therefore be determined to provide a heating profile tailored to preforms for blow molding such containers. For example, the power and position of each of the heating elements in the blow molding apparatus can be set for making one type of container from one type of preform. For such cases, it is not necessary to readjust the position of the heating elements or use a blow molding apparatus where the heating elements can be individually reconfigured or repositioned. Such adjustable blow molding systems can add unnecessary complexity and expense.

Certain blow molding systems can have a fixed and planar array of heating elements, such as a set of parallel lamps, that present a fixed distance to a preform. The preform can pass along the array of heating elements while rotating to absorb thermal energy. The preform can be generally cylindrical where a longitudinal wall of the cylindrical preform is exposed to the set of parallel lamps with each lamp at substantially the same distance from the wall. However, an end of the preform can include a portion of the preform that is further from the heating elements than the longitudinal wall. The end can curve away from the heating elements, for example, where the end of the preform can be generally rounded or hemispherical in shape. This end, also referred to as an endcap, can form the bottom of the container after the preform is blow molded. It can be advantageous to transfer thermal energy to the end of the preform to optimize blow molding of the preform and optimize properties of the bottom portion of the resulting container.

A fixed and planar array of heating elements including a set of parallel lamps can be used to heat the longitudinal wall of the cylindrical preform but may not provide the desired heating for the end of the preform where a portion is further away from the heating elements. In this case, one or more of the heating elements in the array can be positioned closer to the end of the preform and can even be angled to face toward the end of the preform. In particular, the one or more heating elements can be positioned at a distance from the end of the preform that is substantially the same as the distance from the wall of the preform to the remaining heating elements in the fixed and planar array.

The present technology includes a heating element extension that can be used to position one or more heating elements of a heating element array closer to the end of the preform. The extension allows the heating element to be held in a fixed position which ensures a constant distance and orientation in relationship to the preform to provide consistency and repeatability in the blow molding process between job changes on the machine, for example. The heating element extension further allows repositioning of one or more heating elements in a furnace of a blow molding apparatus originally having a fixed and planar array of heating elements.

The extension can hold the heating element using a bracket that fits around the heating element, such as the bulb portion of a quartz lamp or at the base of the lamp where the bracket is not in contact with the bulb. The bracket can become very hot due to a temperature at a surface of the quartz lamp which can reach temperatures of over 2400K. Accordingly, the extension can be formed of a material, such as a metal or metal alloy, that can withstand the thermal energy within the furnace; other examples of such heat resistant materials include various ceramics and composites. Otherwise, the extension would heat up where the material forming the bracket could lose its shape, which may permit the quartz lamp to fall therefrom resulting in damage to the oven and to the lamp. The life of the heating element extension can be several times longer when made of the heat resistant material compared to an extension made of a less heat resistant material.

The extension can also be configured to hold and engage a lamp in a manner that prevents the lamp from changing orientation when or if electrical wires pull on the lamp when the furnace is opened and closed. Shifting orientation of the lamp could result in undesired changes in the bottle quality. Other embodiments of extensions can include a fitting to hold a parabolic lens in front of the heating element to provide controlled heating of the end of the preform, an attachment point to hold a lamp cover, and/or to hold a reflector, such as a parabolic reflector.

FIGS. 1-4 illustrate an embodiment of a heating element extension for holding a heating element, such as a quartz lamp, in a repeatable fixed location in a furnace of a blow molding apparatus to improve heating at an end of a preform and thereby improve the material distribution in the final blow molded container. The extension can be configured to fit the furnace of an existing blow molding apparatus that includes a fixed and planar array of heating elements, where the extension allows a fixed repositioning of one or more of the heating elements. It should be recognized that various aspects of the heating element extension shown can be modified based on the present disclosure in order to conform the extension for use in the furnaces of various blow molding apparatuses.

Figure 2:
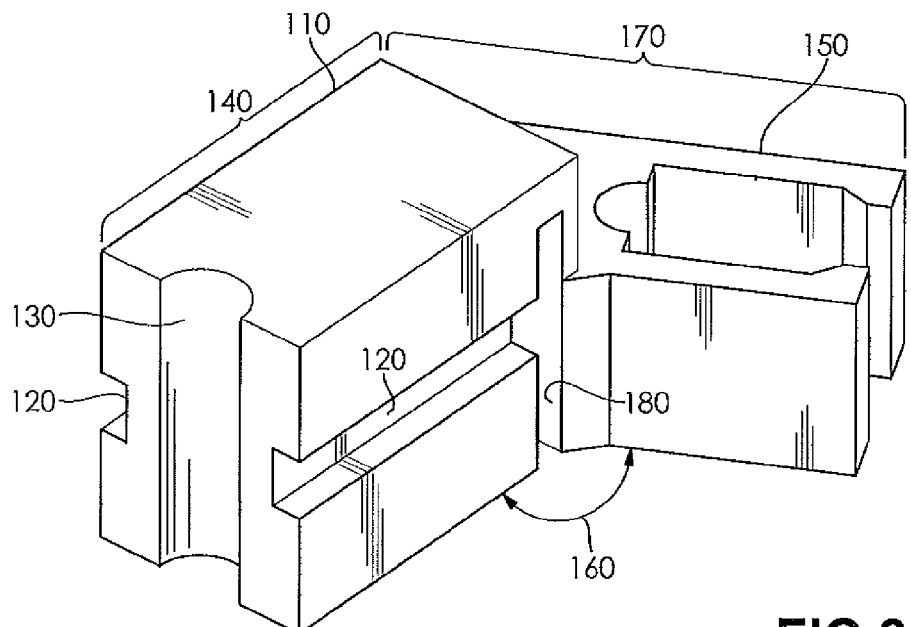
FIG. 2 is another perspective view of the heating element extension of FIG. 1.

Referring now to FIGS. 1 and 2, each figure provides a perspective view of an embodiment of a heating element extension 100. The extension 100 includes a base 110 that can be affixed to a portion of a furnace of a blow molding apparatus (not shown), for example, where the base 110 can fit into a preexisting heating element bracket (not shown). The base 110 can include a key 120 that is adapted to mate with a particular portion of the furnace including various preexisting heating element brackets to couple the extension 100 thereto. Therefore, where it is said that the base 110 and the key 120 allow the extension to be coupled to a portion of the furnace of the blow molding apparatus, the portion of the furnace can include a preexisting heating element bracket.

The key 120 can include one or more features that securely engage the portion of the furnace. The key 120 can be specific for particular furnace features or preexisting heating element brackets for particular blow molding apparatuses. Accordingly, the key 120 can be configured as necessary to allow the base 110 of the extension 100 to be coupled to furnaces in blow molding apparatuses from various manufacturers. For example, the key portion 120 can comprise a slot as shown in FIGS. 1 and 2 to slidably engage a preexisting heating element bracket and affix the heating element extension 100 to the preexisting heating element bracket. In various embodiments, the key 120 can make the base 110 of the extension particular for a particular blow molding apparatus furnace. For example, the key 120 can allow the extension 110 to only be coupled to a portion of a Side1 Universal blow molding machine furnace (Side1 S.A., France). In some embodiments, the base 110 includes a key means (e.g., key 120) configured to couple the extension 100 to a preexisting heating element bracket. It is understood that various shapes of the key 120 can be used.

The base 110 of the extension 100 can further include a recess 130 to accommodate a lamp wire (not shown), where the recess 130 is shown in FIG. 1 as a hemispherical notch. The recess 130 can be other shapes as desired. In some embodiments, the base 110 can include a recess means (e.g., recess 130) for accommodating a heating element wire.

The base 110 can also comprise a length 140 for extending a heating element (not shown in FIGS. 1 and 2) a desired distance. The length 140 of the base 110 can be varied according to various embodiments of the extension 100. In some embodiments, the extension can include a base means (e.g., base 110) having a length configured to extend a heating element a distance (e.g., length 140), where the distance places the heating element closer to an end of a preform compared to other heating elements in the furnace and/or compared to where the heating element would be positioned without use of the extension 100.

The heating element extension 100 can include a bracket 150 to hold the heating element. As shown, the bracket 150 shape can include a slot to receive and hold an end of a lamp. Two extensions 100 can be used to hold each end of a quartz lamp, for example. In some embodiments, the extension includes a bracket means (e.g., bracket 150) that engages and holds a heating element.

The bracket 150 and the base 110 of the extension 100 can define an angle 160 that is less than 180 degrees. The angle 160 can direct the heating element held by the bracket 150 in a particular direction. For example, the angle 160 can be selected to match the radius of the end of a preform; e.g., the angle 160 can direct the heating element held by the bracket 150 in a direction that is substantially perpendicular to a tangent plane of a hemispherical end of the preform. A length 170 of the bracket 150 can determine how far the bracket 150 projects from the extension 100. Accordingly, the length 140 of the base 110, the length 170 of the bracket 150, and the angle 160 between the bracket 150 and the base 110 can each be different in various embodiments to provide heating element extensions 100 that position the heating element in a repeatable fixed location in the furnace of a blow molding apparatus to provide improved heating for the end of the preform. The length 140 of the base 110, the length 170 of the bracket 150, and the angle 160 between the bracket 150 and the base 110 can therefore be configured for a particular preform matched with a particular furnace of a blow molding apparatus to heat an end of the particular preform and achieve a predetermined heating profile for the particular preform.

The heating element extension 100 can also include an attachment point 180 for a cover or a reflector (not shown). Referring to FIG. 1, the attachment point 180 can be a slot to receive and hold the lamp cover or the reflector (e.g., parabolic reflector). Placement of the lamp cover or the reflector in the attachment point 180 can hold the extension 100 in place when coupled to a portion of the furnace in some embodiments.

In some embodiments, a pair of extensions 100 can be used where the extensions 100 are mirror images of each other. That is, one extension 100 can be right-handed and the other can be left-handed. In this manner, each of the extensions 100 in the pair can be coupled to particular portions of the furnace and can hold particular ends of the heating element and/or the cover or the reflector. For example, the attachment points 180 of the pair of extensions 100 can be asymmetrical so that the lamp cover or the reflector can be held between the extensions 100, where each end of the lamp cover can be slid into the attachment point 180 slots shown.

Figure 3:
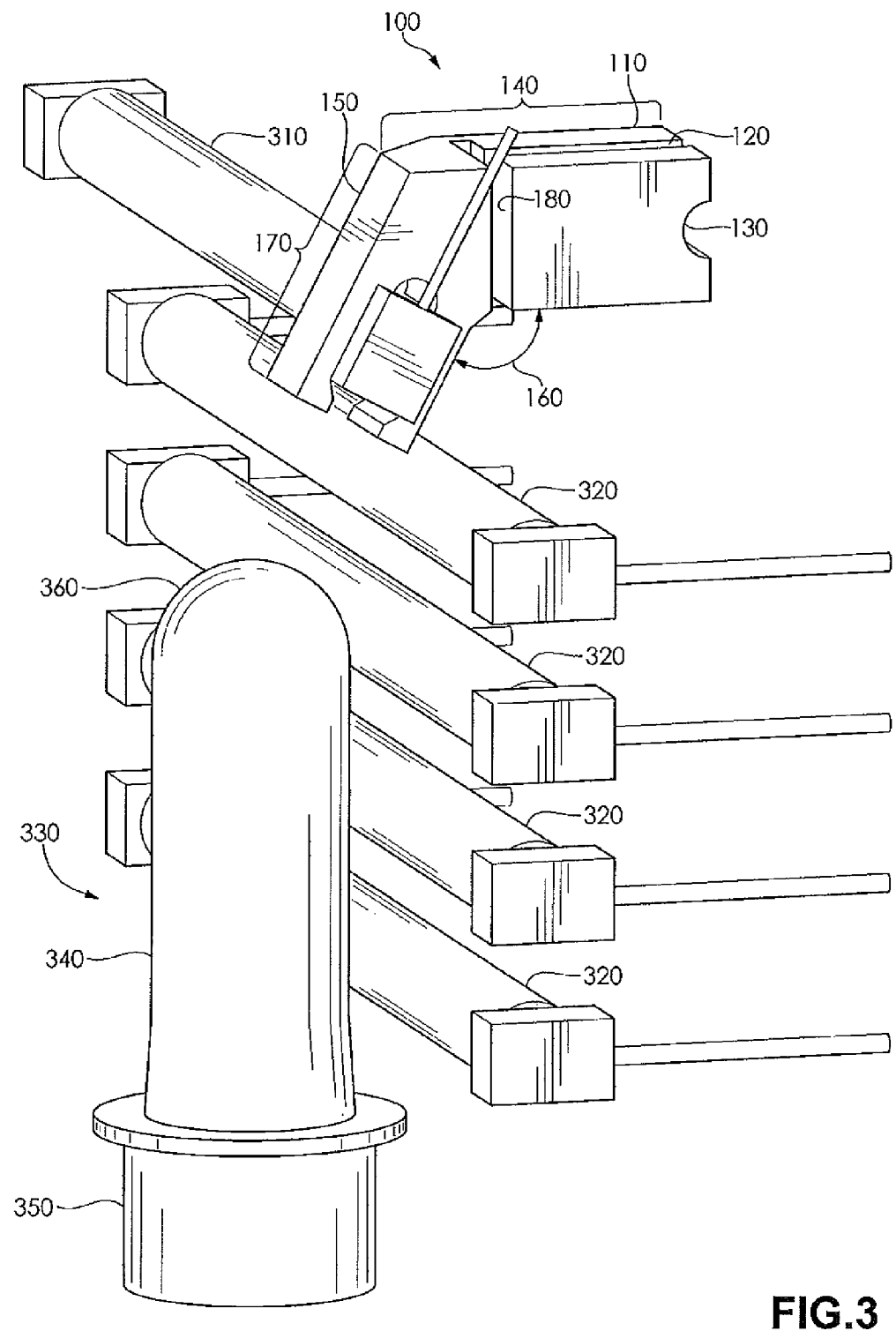
FIG. 3 is a schematic perspective view of a preform in a portion of a furnace of a blow molding apparatus, the furnace having a plurality of quartz lamps, including a quartz lamp disposed in the heating element extension depicted in FIGS. 1 and 2.

Referring now to FIG. 3, a portion 300 of a furnace in a blow molding apparatus is shown in perspective, where a heating element extension 100 is holding a heating element, such as a lamp 310. For example, the lamp 310 can be a preexisting lamp in the furnace that is repositioned in relation to other lamps 320 in their original positions, where the lamps 320 are held in preexisting heating element brackets in the furnace of the blow molding apparatus and the base 110 of the extension 100 is coupled to a preexisting heating element bracket.

A substantially cylindrical preform 330 is shown having a longitudinal wall 340 that is near a fixed and planar array of heating elements comprising the lamps 320. The lamps 320 are a fixed distance from the wall 340 of the preform 330 while it passes along the lamps 320 in the furnace tunnel and rotates. One end 350 of the preform 330 can form an opening or neck of a container that is blow molded from the preform 330. The end 350 can be threaded in some embodiments for engaging a closure, such as a threaded cap. The end 350 can also be kept cooler (e.g, by shading) than the remainder of the preform 330 so that the end 350 is not substantially altered or deformed during the subsequent blow molding operation.

The repositioned lamp 310 can be held by the bracket 150 of the extension 100 so that the repositioned lamp is closer to another end 360 of the preform 330 that can form the bottom of the container blow molded from the preform 330. The extension 100 allows the repositioned lamp 310 to be closer to the end 360 of the preform 330, particularly where a portion of the end 360 curves away from the other lamps 320. In this manner, the extension 100 allows the repositioned lamp 310 to better heat the end 360 of the preform 330 compared to the other lamps 320 and compared to a position of the lamp 310 without the extension 100.

As noted, the extension 100 can be tailored in various dimensions so that a particular furnace of a particular blow molding apparatus can consistently heat a particular preform to a predetermined heating profile, including improved heating of the end 360 of the preform 330, also known as the endcap. Dimensions of the extension 100 that can be tailored to include the length 140 of the base 140, the length 170 of the bracket 150, and the angle 160 between the bracket 150 and the base 110.

Figure 4:
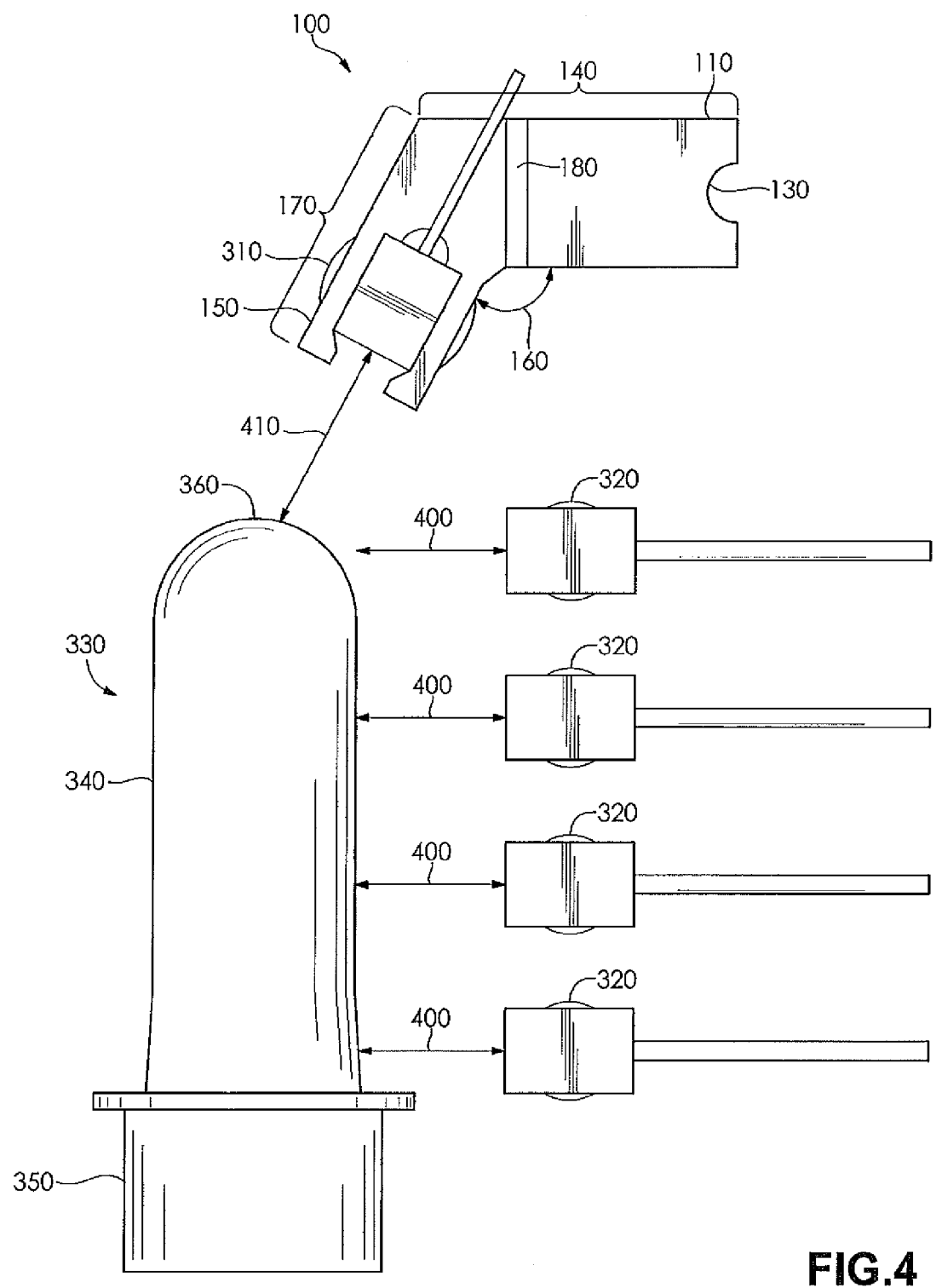
FIG. 4 is a schematic end elevational view of a preform in a portion of a furnace of a blow molding apparatus, the furnace having a plurality of quartz lamps, including a quartz lamp disposed in the extension depicted in FIGS. 1 and 2.

FIG. 4 depicts an end view of the portion 300 of the furnace in the blow molding apparatus from FIG. 3. A distance 400 between the planar array of lamps 320 and the wall 340 of the preform 330 can be substantially constant as the preform 330 travels along the lamps 320 through the furnace. Without the extension 100, for example, the repositioned lamp 310 could have been aligned with the other lamps 320 where a portion of the end 360 would be at a distance greater than the distance 400 between the planar array of lamps 320 and the wall 340 of the preform 330. However, with the extension 100, the repositioned lamp 310 extends towards the end 360 of the preform 330 providing a distance 410 between the repositioned lamp 310 and the end 360 of the preform 330 that can be substantially the same as the distance 400 or at least closer to the end 360 than the repositioned lamp 310 would be without the use of the extension 100.

The heating element extension 100 can also include a fitting (not shown) to hold a focusing device, such as a parabolic lens, in front of the repositioned lamp 310 to provide additional control in heating the end 360 of the preform 330. This can lead to better heating performance, leading to improved material distribution in the base of the bottle. In some embodiments, the attachment point 180 can be used as the fitting.

Various heating element extensions 100 can be fabricated to accommodate various furnaces and preexisting heating element brackets of various blow molding machines. For example, extensions can be made that fit furnaces in blow molding machines by Sidel (Groupe Sidel S.A., France) including Series 1 and 2 and Universal machines and extensions can be made that fit blow molding machines by Krones A.G. (Neutraubling, Germany).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A heating element extension for positioning a heating element in a furnace of a blow molding apparatus, the heating element extension comprising:
   a base at one end of the extension, the base configured to couple the extension to the furnace, wherein the base is configured to be coupled to a preexisting heating element bracket within the furnace; and
   a bracket at another end of the extension, the bracket configured to hold the heating element.

2. The heating element extension of claim 1, wherein the base comprises a key configured to mate with a portion of the furnace.

3. The heating element extension of claim 2, wherein the key is configured to mate with a preexisting heating element bracket within the furnace.

4. The heating element extension of claim 1, wherein the base comprises a recess configured to accommodate a wire from the heating element.

5. The heating element extension of claim 1, wherein the bracket is configured to hold an end of the heating element.

6. The heating element extension of claim 1, wherein the base and the bracket define an angle that is less than 180 degrees.

7. The heating element extension of claim 1, further comprising an attachment point configured to receive a cover or reflector.

8. A pair of heating element extensions, wherein one extension comprises the heating element extension according to claim 1 and the other extension comprises a mirror image of the heating element extension according to claim 1.

9. A blow molding apparatus comprising:
   a furnace comprising a heating element extension, the extension comprising:
      a base at one end of the extension, the base coupling the extension to the furnace, wherein the base is configured to be coupled to a preexisting heating element bracket within the furnace; and
      a bracket at another end of the extension, the bracket configured to hold a heating element.

10. The blow molding apparatus of claim 9, wherein the furnace comprises:
   a planar array of heating elements; and
   a separate heating element held by the bracket of the extension, wherein the separate heating element is not in the same plane as the planar array of heating elements.

11. The blow molding apparatus of claim 10, wherein the furnace further comprises a preform, the preform comprising an end.

12. The blow molding apparatus of claim 11, wherein the separate heating element held by the bracket of the extension is directed toward the end of the preform.

13. The blow molding apparatus of claim 12, wherein the separate heating element held by the bracket of the extension is directed toward the end of the preform by an angle that is less than 180 degrees, the angle defined by the base and the bracket of the extension.

14. The blow molding apparatus of claim 10, wherein the separate heating element held by the bracket of the extension is substantially the same distance from the end of the preform as a distance between the planar array of heating elements and a longitudinal wall of the preform.

15. A method for heating an end of a preform comprising:
   providing a blow molding apparatus comprising a furnace, the furnace comprising:
      a planar array of heating elements and a separate heating element held by a heating element extension, the extension comprising a base at one end of the extension coupling the extension to the furnace, the base configured to be coupled to a preexisting heating element bracket within the furnace, and a bracket at another end of the extension holding the separate heating element; and
      a preform having an end, wherein the separate heating element held by the bracket of the extension is directed toward the end of the preform; and
   heating the end of the preform using the separate heating element.

16. The method of claim 15, wherein the separate heating element held by the bracket of the extension is directed toward the end of the preform by an angle that is less than 180 degrees, the angle defined by the base and the bracket of the extension.

17. The method of claim 15, wherein the separate heating element held by the bracket of the extension is substantially the same distance from the end of the preform as a distance between the planar array of heating elements and a longitudinal wall of the preform.

18. The method of claim 15, further comprising rotating the preform while moving the preform through the furnace.

19. A method for blow molding a container comprising blow molding a preform heated according to the method of claim 15.

20. A heating element extension for positioning a heating element in a furnace of a blow molding apparatus, the heating element extension comprising:
   a base at one end of the extension, the base configured to couple the extension to the furnace, wherein the base comprises a key configured to mate with a portion of the furnace and the key is configured to mate with a preexisting heating element bracket within the furnace; and a bracket at another end of the extension, the bracket configured to hold the heating element.

21. The heating element extension of claim 20, wherein the bracket is configured to hold an end of the heating element.

22. A heating element extension for positioning a heating element in a furnace of a blow molding apparatus, the heating element extension comprising:
   a base at one end of the extension, the base configured to couple the extension to the furnace, wherein the base comprises a recess configured to accommodate a wire from the heating element; and
   a bracket at another end of the extension, the bracket configured to hold the heating element.

23. The heating element extension of claim 22, wherein the bracket is configured to hold an end of the heating element.

24. A heating element extension for positioning a heating element in a furnace of a blow molding apparatus, the heating element extension comprising:
   a base at one end of the extension, the base configured to couple the extension to the furnace;
   a bracket at another end of the extension, the bracket configured to hold the heating element; and
   an attachment point configured to receive a cover or reflector.

25. The heating element extension of claim 24, wherein the bracket is configured to hold an end of the heating element.

26. A blow molding apparatus comprising:
   a furnace comprising a heating element extension, the extension comprising:
   a base at one end of the extension, the base coupling the extension to the furnace, wherein the base comprises a key configured to mate with a portion of the furnace and the key is configured to mate with a preexisting heating element bracket within the furnace; and
   a bracket at another end of the extension, the bracket configured to hold a heating element.

27. A blow molding apparatus comprising:
   a furnace comprising a heating element extension, the extension comprising:
   a base at one end of the extension, the base coupling the extension to the furnace, wherein the base comprises a recess configured to accommodate a wire from the heating element; and
   a bracket at another end of the extension, the bracket configured to hold a heating element.

28. A blow molding apparatus comprising:
   a furnace comprising a heating element extension, the extension comprising:
   a base at one end of the extension, the base configured to couple the extension to the furnace;
   a bracket at another end of the extension, the bracket configured to hold the heating element; and
   an attachment point configured to receive a cover or reflector.

\* \* \* \* \*